US006254130B1

(12) United States Patent
Jayaraman et al.

(10) Patent No.: US 6,254,130 B1
(45) Date of Patent: Jul. 3, 2001

(54) METHOD AND APPARATUS FOR CONTROLLING AIR BAG DEPLOYMENT

(75) Inventors: Sundaresan Jayaraman; Rangaswamy Rajamanickam; Chandramohan Gopalsamy, all of Atlanta; Sungmee Park, Tucker, all of GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/295,982

(22) Filed: Apr. 21, 1999

Related U.S. Application Data
(60) Provisional application No. 60/081,640, filed on Apr. 13, 1998.

(51) Int. Cl.$^7$ .................................................. B60R 21/16
(52) U.S. Cl. ............................... 280/743.2; 280/743.1; 280/735; 280/731
(58) Field of Search .............................. 280/743.2, 743.1, 280/735, 731

(56) References Cited

U.S. PATENT DOCUMENTS

| 5,073,418 |   | 12/1991 | Thornton et al. .................... 428/34.9 |
| 5,165,716 |   | 11/1992 | Imai et al. ........................... 280/730 |
| 5,236,775 |   | 8/1993  | Swoboda et al. .................... 428/225 |
| 5,358,273 |   | 10/1994 | Onishi et al. ..................... 280/743 R |
| 5,362,101 | * | 11/1994 | Sugiura et al. ....................... 280/743 |
| 5,547,215 |   | 8/1996  | Taguchi et al. ...................... 280/732 |
| 5,554,424 |   | 9/1996  | Krummheuer et al. ............. 428/35.2 |
| 5,573,270 |   | 11/1996 | Sogi et al. ............................ 280/740 |
| 5,637,114 |   | 6/1997  | Hohnke .................................... 8/137 |
| 5,722,686 | * | 3/1998  | Blackburn et al. .................. 280/735 |
| 5,732,375 | * | 3/1998  | Cashler .................................. 701/45 |
| 5,887,894 | * | 3/1999  | Castagner et al. ................. 280/743.2 |
| 5,957,490 | * | 9/1999  | Sinnhuber .......................... 280/735 |
| 6,018,693 | * | 1/2000  | Blackburn et al. .................... 701/45 |
| 6,056,079 | * | 5/2000  | Cech et al. ............................ 180/273 |
| 6,076,854 | * | 6/2000  | Schenck et al. .................. 280/743.2 |
| 6,092,838 | * | 7/2000  | Walker ................................. 280/735 |

OTHER PUBLICATIONS

Keshavaraj, et al., "Analysis of Fabrics Used in Passive Restraint Systems–Airbags," J. Text. Inst., 1996, 87, Part 1, No. 3, Textile Institute, pp. 554–571.

Weiss, "Curbing Air Bags' Dangerous Excesses New Smarts, New Sensors, and Variable Inflation Could Reduce Injury and Death," Science News, vol. 154, Sep. 26, 1998, pp. 206–207.

"Passive Safety," Focus, Automotive Engineering, Nov. 1997, pp. 43–54.

"Smashing Performer," Automotive Engineering Safety, Mar. 1998, pp. 29–30.

"Protect and Survive," Automotive Engineering: Safety, Jul. 1996, pp. 46–47.

Conlee, "Passenger Side Air Bag System for Open Interior Architecture," pp. 19–22.

(List continued on next page.)

Primary Examiner—J. J. Swann
Assistant Examiner—J. Allen Shriver
(74) Attorney, Agent, or Firm—Thomas, Kayden, Horstemeyer & Risley, L.L.P.

(57) ABSTRACT

The present invention relates to an air bag control system comprising a restraining apparatus adapted to be connected to an occupant side of an air bag, an extension/retraction device used to adjust the degree to which the restraining apparatus can be extended, and a control device for controlling extension and retraction of the extension/retraction device. In operation, the restraining apparatus can be retracted by the extension/retraction device in response to a signal sent by the control device to limit the physical extent to which the air bag can deploy to prevent injury of a vehicle occupant adjacent the air bag.

30 Claims, 4 Drawing Sheets

OTHER PUBLICATIONS

"Focus On . . . Passive Safety," Automotive Engineering: Focus, Oct./Nov. 1996, pp. 42–54.

Morton, "In the Bag," Automotive Engineering: Passive Safety, Jul./Aug. 1998, pp. 45–47.

Martin, "Adaptive Airbags Coming: Takata's Smart Strategy Tailors Airbag Performance to Occupant Size, Seating Position, and Crash Situation," AI, Mar. 1997, p. 87.

Kobe, "Smart Airbags: Automakers and Safety Groups Agree that 'Smart' Airbag Technology Will Save Lives—The Key Question is When," AI, Jan. 1997, pp. 62–63.

Visnic, "Smart Bags for Dumb Drivers: Safety System Suppliers Race to Improve Sagging Image," WARD's Auto World, Feature/Safety Engineering, Apr. 1997, pp. 33–36.

Keenan, "Industry to NHTSA: Power Down on Airbags," WARD's Auto World, Feature/Safety Testing, Nov. 1996, pp. 47–48.

"New–Car Dealers Join National Effort to Improve Vehicle Air Bag Safety," http://www.nadanet.com/news/112296.htm, Press Release, Nov. 22, 1996, p. 1.

Keshavarij, et al., "Airbag Fabric Material Modeling of Nylon and Polyester Fabrics Using a Very Simple Neural Network Architecture," Journal of Applied Polymer Science, vol. 60, 1996, pp. 2329–2338.

Keshavaraj, et al., "A Realistic Comparison of Biaxial Performance of Nylon 6,6 and Nylon 6 Fabrics Used in Passive Restraints–Airbags," Journal of Applied Polymer Science, vol. 61, 1996, pp. 1541–1552.

* cited by examiner

METHOD AND APPARATUS FOR CONTROLLING AIR BAG DEPLOYMENT

CROSS REFERENCE TO RELATED APPLICATION

This application claims the benefit of the filing date of U.S. Provisional Patent Application Ser. No. 60/081,640, filed Apr. 13, 1998. The foregoing disclosure is incorporated herein by reference.

FIELD OF THE INVENTION

The invention generally relates to a method and apparatus for controlling air bag deployment. More particularly, the invention relates to a method and apparatus that can be used to limit the physical extent of air bag deployment.

BACKGROUND OF THE INVENTION

Passive restraint devices known as air bags frequently are used in automobiles to reduce occupant (driver or passenger) injuries and/or fatalities that result from vehicular accidents. As is known in the art, air bag restraint systems restrain forward movement of the occupant to protect him or her from contact with the interior of the vehicle by instantaneously inflating to cushion the occupant. Generally speaking, air bag systems comprise an inflater for releasing a gas (e.g., nitrogen), a bag to be inflated by the released gas, a housing enclosing the inflater and the bag, a sensor detecting a collision of greater than a predetermined magnitude, and a control system that transmits a signal to the inflater to activate inflation of the bag. When the gas is released from the inflater, it fills the bag to exert an inner pressure upon the interior walls of the bag, which urges the bag to inflate.

Ironically, although air bags are intended to prevent injuries, air bags themselves can cause occupant injuries and even fatalities, especially when the occupant is relatively small or frail (e.g., children, the elderly). The primary reason for these injuries, is the high speed and pressure at which such air bags deploy (e.g., 200 mph, 34 psi) as well as the particular part of the person's body that impacts the air bag. Normally, it is the face and neck of such an occupant that bears the brunt of this impact.

In response to the occurrence of such injuries, several manufacturers have begun development of so-called "smart" air bags. Generally speaking, smart air bags use some form of sensing device to determine certain physical characteristics of a vehicle occupant that is to be cushioned by the bag if the vehicle were involved in an accident. For example, if it is determined by the sensing device that the occupant is small in size and/or weight, the air bag is either temporarily disabled or is adjusted to inflate with less force to avoid injuring the occupant. Although such smart air bags may prevent typical air bag injuries, their use could permit more common vehicular injuries to occur. In the case of the temporarily disabled air bag, no buffer whatsoever is provided between the occupant and the vehicle interior to cushion the occupant. As for the less forcefully deploying air bag, it is possible that inflation may not occur quickly enough to fully cushion the occupant, or that the air bag may not inflate to the degree necessary to fully protect the occupant.

From the above, it can be appreciated that it would be desirable to have a method and apparatus for controlling air bag deployment that provides for complete cushioning of the occupant in a vehicular accident with less risk of occupant injury caused by the air bag's deployment.

SUMMARY OF THE INVENTION

The present invention relates to an air bag control system. The system comprises a restraining apparatus adapted to be connected to an occupant side of an air bag, an extension/retraction device used to adjust the degree to which the restraining apparatus can be extended, and a control device for controlling extension and retraction of the extension/retraction device. In operation, the restraining apparatus can be retracted by the extension/retraction device in response to a signal sent by the control device to limit the physical extent to which the air bag can deploy to prevent injury of a vehicle occupant adjacent the air bag.

In a preferred arrangement, the system further comprises a sensing device which senses at least one physical characteristic of the occupant to be cushioned by the air bag. A signal then can be sent from the sensing device to the control device such that the determination can be made as to whether, and to what degree, to restrict deployment of the air bag. By way of example, the sensing device can be adapted to determine the weight, size, and/or position of the occupant.

The objects, features, and advantages of this invention will become apparent upon reading the following specification, when taken in conjunction with the accompanying drawings. It is intended that all such additional features and advantages be included therein with the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
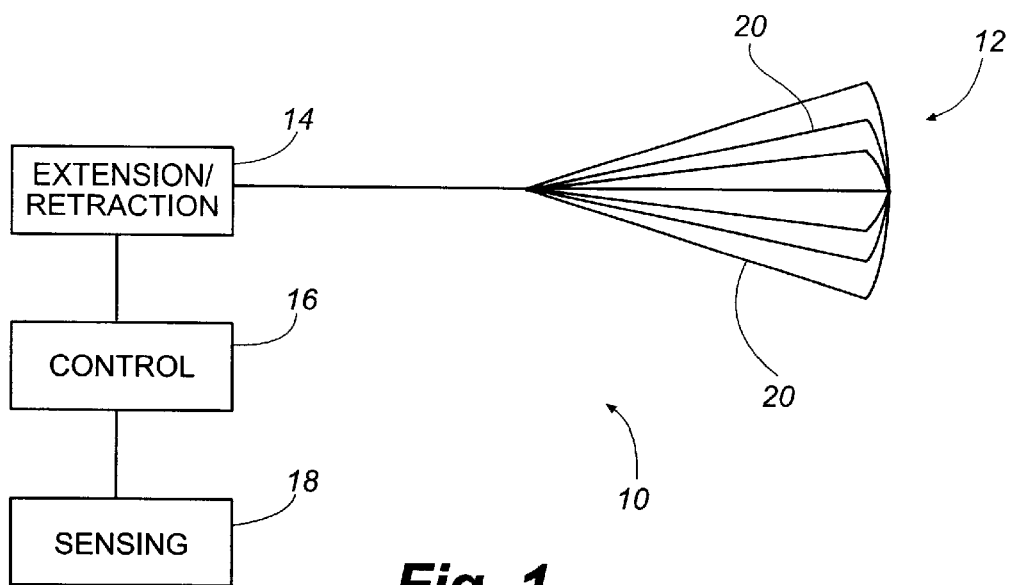
FIG. 1 is a schematic of an air bag control system constructed in accordance with the principles of the present invention.

Referring now in more detail to the drawings, in which like numerals indicate corresponding parts throughout the several views, FIG. 1 illustrates an air bag control system 10 constructed in accordance with the principles of the present invention. As indicated in this figure, the control system generally comprises a restraining apparatus 12, an extension/retraction device 14, a control device 16, and sensing device 18. Typically, the restraining apparatus 12 comprises a plurality of tethers 20 that are adapted to connect to the air bag with which the air bag control system 10 is used. By way of example, the tethers 20 can be constructed from high tenacity fiber yarns or straps. Such yams or straps could be constructed from high performance fibers such as polyamides, polyesters, and/or polyethylenes. Although such tethers are deemed preferable, it will be understood from the present disclosure that alternative retaining apparatus could be used, if desired. For example, the retaining apparatus could comprise a telescopic member which is flexible enough so as to be suitable for use within an air bag.

Figure 2:
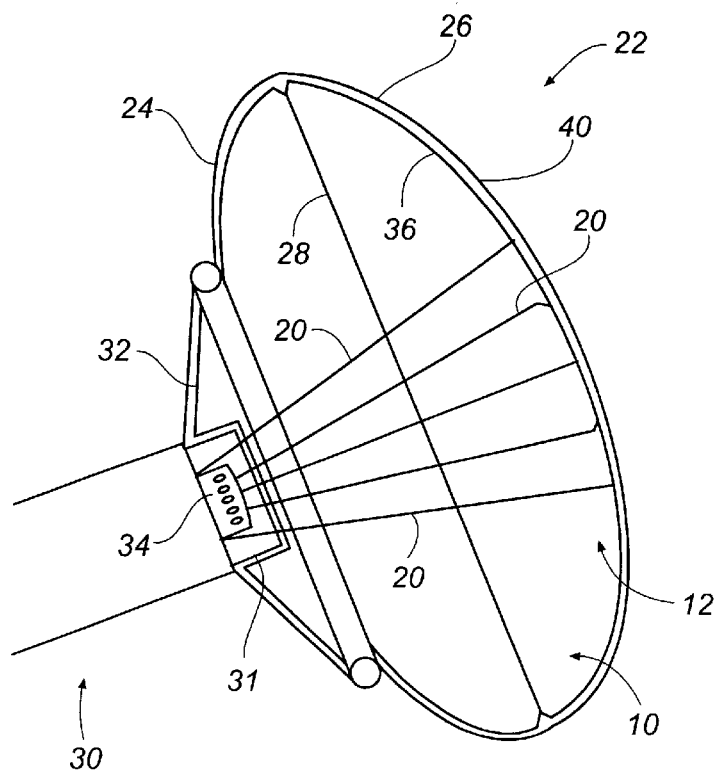
FIG. 2 is a partial cross-sectional view of a fully deployed air bag including the air bag control system shown in FIG. 1.

FIG. 2 illustrates a deployed air bag 22 which includes the air bag control system 10 shown in FIG. 1. As indicated in this figure, the air bag 22 typically comprises two separate sections: an inflater side 24 and an occupant side 26. As is known in the art, both the inflater side 24 and the occupant side 26 are constructed of a high strength woven fabric having specific air permeability properties. By way of example, this fabric can comprise nylon 6,6. The two air bag sides 24, 26 normally are sewn together along a seam 28. In the arrangement shown in FIG. 2, the air bag 22 is depicted in a deployed state extending from a steering column 30 of a vehicle (not shown). In particular, the air bag 22 is shown deployed from an air bag housing 31 of the steering wheel 32. Although the air bag is shown in conjunction with the steering wheel, it is to be appreciated that the principles disclosed herein are equally applicable to passenger air bags, including side impact air bags. Moreover, although a substantially circular air bag is shown in the figures, it is to be understood that these principles are equally applicable to rectangular air bags. Regardless of the location and configuration of the air bag 22, deployment is effected through use of an inflater head 34 (in the embodiment of FIG. 2, located within the central portion of the steering wheel 32).

As shown in FIG. 2, the restraining apparatus 12 of the air bag control system 10 extends from the air bag housing 31 to the occupant side 26 of the air bag 22. In particular, each of the tethers 20 extends from a point adjacent the outer periphery of the inflater head 34 to a specified point along the occupant side 26 of the bag 22. Although each of the tethers 20 is shown positioned in this location, it will be understood by persons having ordinary skill in the art that the tethers alternatively could extend from a point remote from the inflater head or from a central point within the inflater head, if desired.

Figure 3:
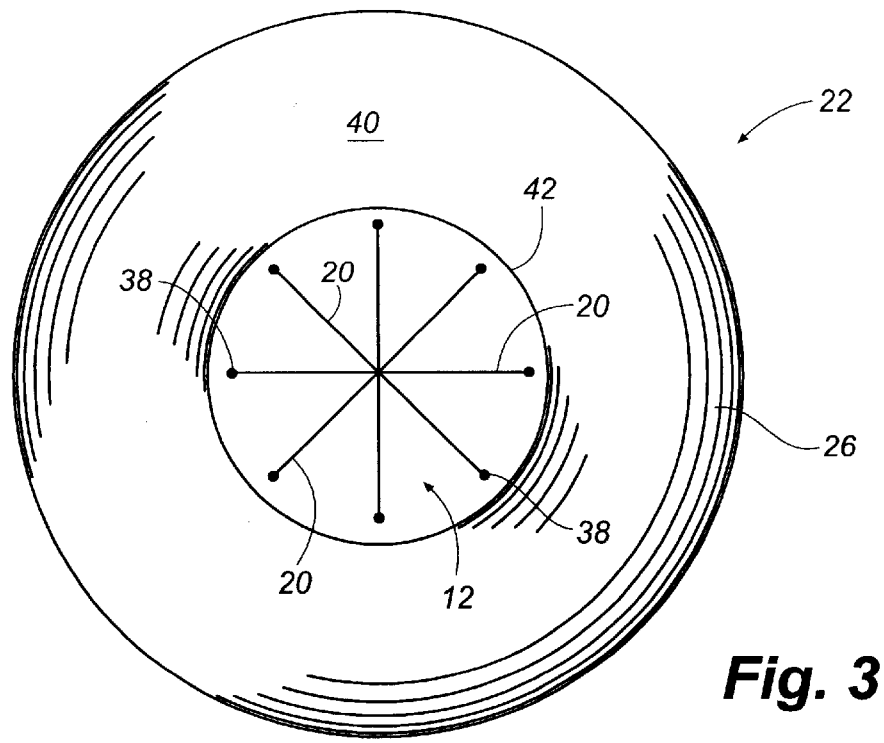
FIG. 3 is a front view of an air bag showing a first tether arrangement.
Figure 4:
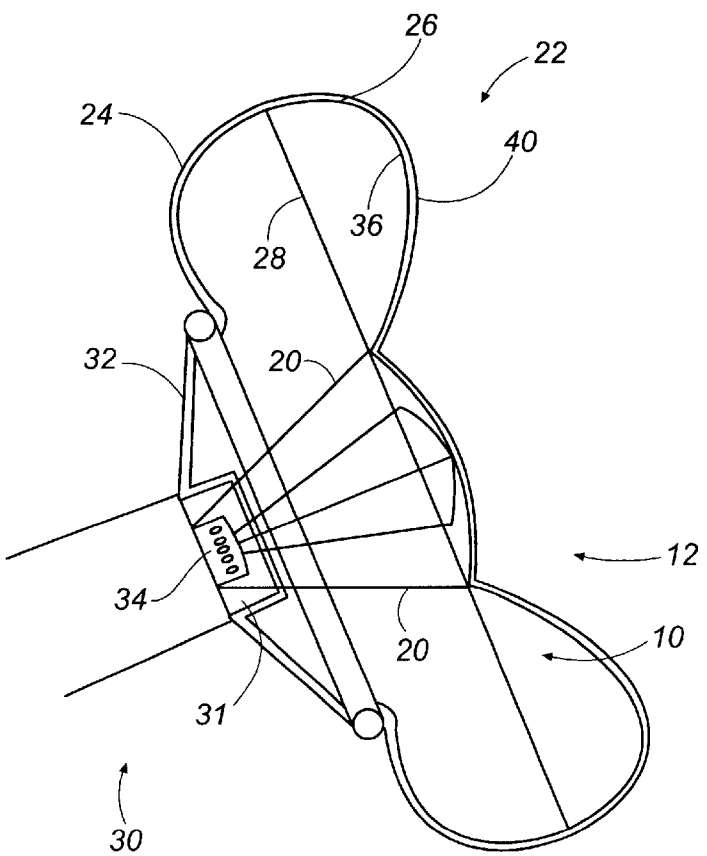
FIG. 4 is a partial cross-sectional view of a partially deployed air bag using the air bag control system shown in FIG. 1.

As indicated in FIG. 3, each of the tethers 20 of the embodiment extends through an aperture 38 formed in the occupant side 26 of the air bag 22 so that a predetermined length of each tether extends along an outer surface 40 of the air bag occupant side to pass through another aperture 38 formed in occupant side to return to the air bag housing 31. To prevent shifting of the individual tethers 20 along the outer surface 40 of the air bag 22, the outer surface can be provided with a coating 42 that covers each tether length. Although this coating 42 could comprise any suitable material, preferably this coating comprises a durable polymeric material. In addition to securing the relative positions of the tethers 20, this coating 42, when provided, further strengthens the apertures 38 to prevent tearing of the apertures by the tethers 20 upon bag deployment. Arranged in this manner, the tethers 20 can be used to limit the extent of deployment of the air bag 22. An example of such limitation is illustrated in FIG. 4. As indicated in this figure, the length of the portion of each tether 20 extending from the air bag housing 31 to the occupant side 26 of the air bag 22 is substantially less than the length of these portions when the air bag is in the fully deployed state illustrated in FIG. 2. The shortening of this distance results in the extent of the air bag's deployment being similarly reduced. With reference back to FIG. 1, this limitation in deployment is effected by the air bag control system 10. In particular, the extension/retraction device 14 is used to retract the restraining apparatus 12 such that the air bag 22 cannot extend to its fully deployed state. Operating in this manner, the degree of air bag deployment can be restricted by the air bag control system 10, and in particular by the degree of the retraction of restraining apparatus 12.

The extension/retraction device 14 can take any one of myriad forms. By way of example, the extension/retraction device 14 can comprise a motorized take-up mechanism which includes a rotatable take-up spool. Irrespective of its particular construction, however, the device 14 preferably includes some form of indexing mechanism, such as a ratchet mechanism, so that the restraining apparatus 12 cannot inadvertently be extended beyond the intended extent. As mentioned above, extention and retraction of the restraining apparatus 12 is controlled by the control device 16. In a preferred arrangement, the control device 16 comprises a microprocessor. In use, the control device 16 sends a signal to the extension/retraction device 14 to activate the device to either extend or retract the restraining apparatus 12 to modify the degree to which the air bag 22 can deploy. The determination of whether adjustment of the restraining device 12 is needed typically is made by the control device 16 with reference to information sensed by the sensing device 18. Normally, the sensing device 18 transmits certain information to the control device 16 regarding the physical characteristics of the occupant that is to be cushioned by the air bag 22. Such physical characteristics can include the occupant's weight, size (e.g., height), and positioning relative to the air bag deployment origin. To retrieve all of this information, the sensing device 18 typically comprises a plurality of sensors, each capable of sensing one or more physical characteristics of the occupant. By way of example, the occupant's weight can be determined with pressure cells that are distributed within the occupant's seat. As for the occupant's size, a dash mounted infra-red sensor can be used to both detect the presence of the occupant and determine his or her physical size. Similarly, such a sensor can be used to determine the relative positioning between the air bag housing and the occupant.

As indicated in FIGS. 3 and 4, the restraining apparatus 12 preferably is arranged such that a substantially circular restraint pattern is formed (regardless of orientation of the bag's outer periphery). In the embodiment depicted in these figures, this circular restraint pattern is formed in a central portion of the air bag 22. It is this portion of an air bag 22 that the head and neck of a child or a person of small stature would likely impact in a vehicular accident Accordingly, this portion of the air bag 22 can be restrained so as to reduce deployment injuries to such an occupant. Furthermore, the circular pattern insures greater uniformity in forming the restraints area.

Figure 5:
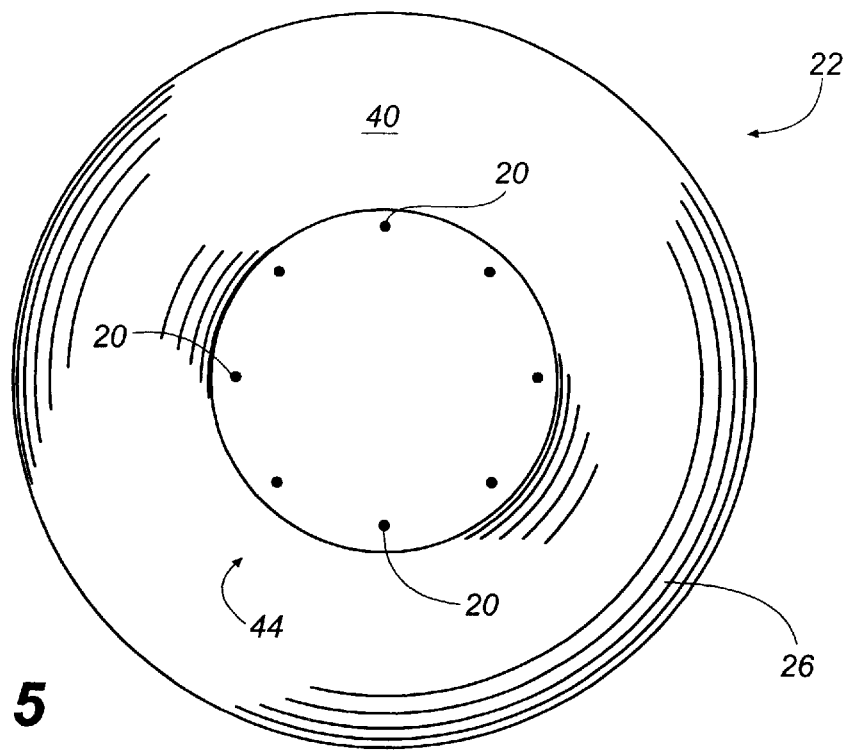
FIG. 5 is a front view of an air bag showing a second tether arrangement.
Figure 6:
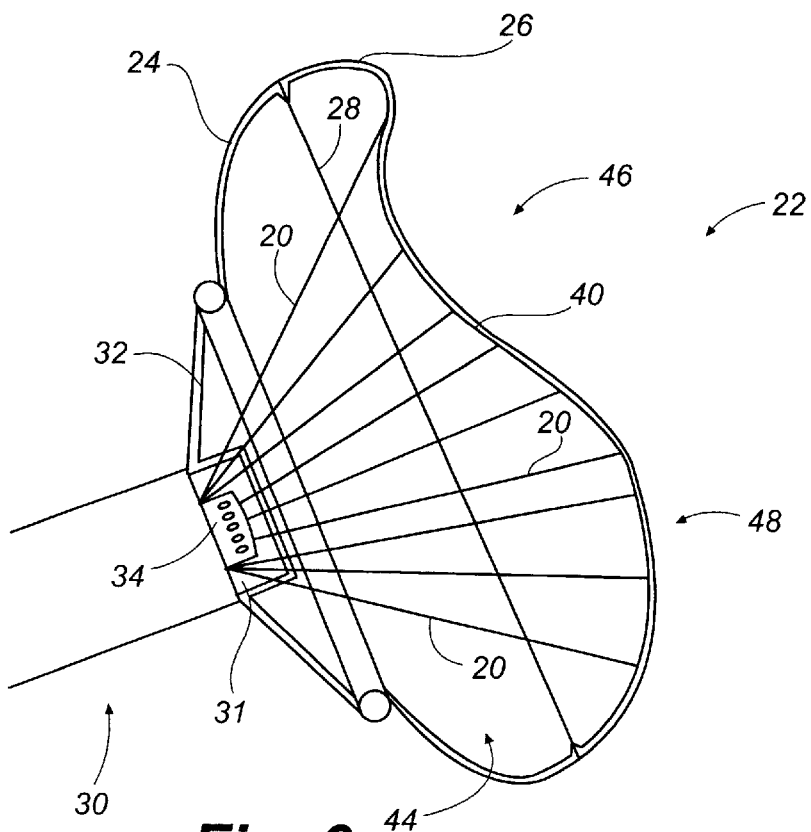
FIG. 6 is a partial cross-sectional view of a partially deployed air bag using the tether arrangement shown in FIG. 5.

FIG. 5 depicts a second tether arrangement for restraining deployment of the air bag 22. Similar to the restraining apparatus 12 depicted in FIGS. 1–4, the restraining apparatus 44 in this second tether arrangement comprises a plurality of tethers 20. However, in the second arrangement, the tethers 20 do not extend outwardly from the inside of the air bag 22 to travel along the outer surface 40 of the occupant side 26 of the air bag. Instead, each of these tethers 20 is secured to an inner surface 36 of the occupant side of the air bag 22 such that discrete points of the air bag can be controlled during deployment. Attachment of the tethers 20 to the air bag 22 can be accomplished by a variety of means. Preferably, however, each of these tethers 20 is fastened to the air bag 22 by way of gluing or stitching. With an arrangement such as that depicted in FIG. 5, the air bag control system 10 can be used to control not only the total extent of deployment of the air bag 22, but further can be used to control the shape of the deployed air bag. As shown in FIG. 6, for instance, the individual tethers 20 can be retracted individually such that a top portion 46 of the bag cannot deploy as far as a bottom portion 48 of the bag. Controlled in this manner, the air bag 22 can assume a generally L-shaped configuration. Such a configuration may be desirable for use with an average height occupant who is relatively frail (e.g., light in weight). The head and neck of such occupants likely would impact this restrained top portion 46 of the air bag 22 so that potential injury from bag impact could be avoided.

Figure 7:
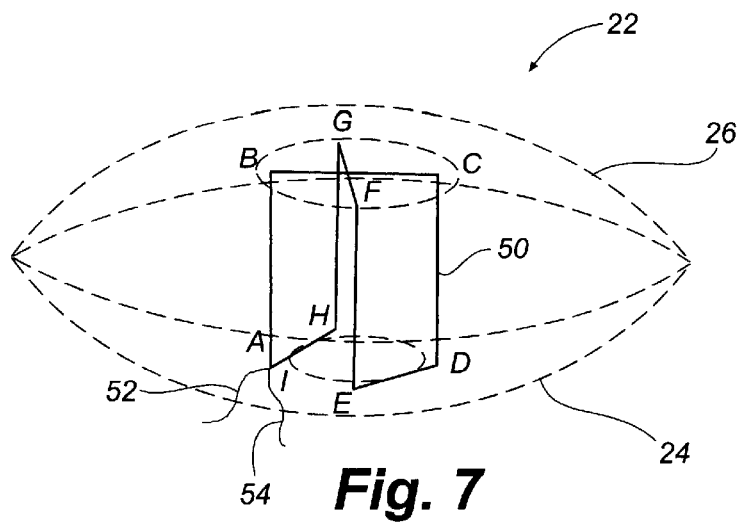
FIG. 7 is a perspective view of a third tether arrangement.

FIG. 7 shows a third tether arrangement. As is illustrated by this figure, a single tether 50 can be strung between inflater side 24 and the occupant 26 of the air bag 22 in a geometrical pattern such that uniform adjustment of air bag deployment can be achieved by merely retracting the two ends 52 and 54 of the single tether 50. By way of example, the tether 50 can be strung from point A, to B, to C, and so on to point I which is located proximate to point A. In such an arrangement, the tether 50 would extend along the outer surface 40 of the occupant side 26 of the air bag 22 in similar manner to the tethers 20 shown in FIGS. 1 through 4. In the particular arrangement shown in FIG. 7, the tether 50 runs along the exterior of the air bag 22 along lengths B, C and F, G. Unlike the restraining apparatus 12 shown in FIGS. 1 through 4, however, no coating is provided over top the tether 50 in that the portion of the tether extending outside of the air bag 22 will change as the tether is retracted by the extension/retraction device 14.

Figure 8:
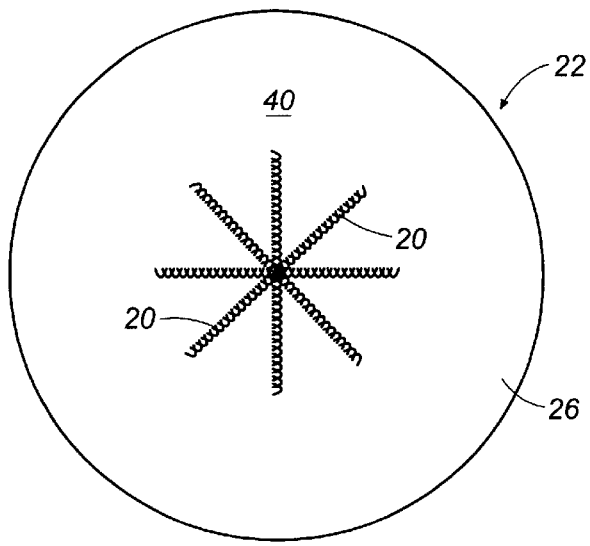
FIG. 8 is a front view of an air bag showing a fourth tether arrangement.
Figure 9:
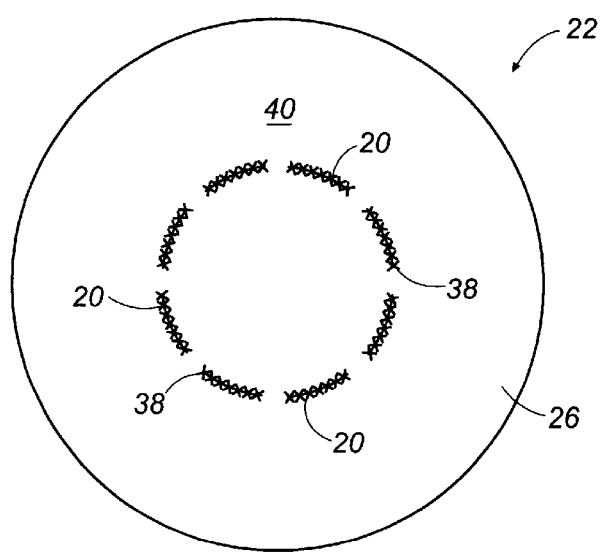
FIG. 9 is a front view of an air bag showing a fifth tether arrangement.

FIG. 8 illustrates a fourth tether arrangement in which tethers 20 are stitched to the occupant side 26 of the air bag 22. This arrangement provides the same effect as the coated embodiment shown in FIG. 3 and therefore prevents the shifting of the individual tethers 20 along the outer surface 40 of the air bag. In yet another tether arrangement shown in FIG. 9, individual tethers 20 extend through the occupant side 26 of the air bag 22 as in the embodiment of FIGS. 2–4, but are stitched to the occupant side in a different pattern to achieve the same objective, viz., to prevent the shifting of the individual tethers along the outer surface 40 of the air bag.

While preferred embodiments of the invention have been disclosed in detail in the foregoing description and drawings, it will be understood by those skilled in the art that variations and modifications thereof can be made without departing from the spirit and scope of the invention as set forth in the following claims. For instance, although the air bag control system disclosed herein is described as comprising a sensing device, it is to be understood that manual adjustment is feasible, for example through the use of an input device such as a switch. In addition, where no manual or automatic control is desired, the tethers 20 can be fixed at predetermined lengths that will regulate the extent of deployment. In such an embodiment, the sensing and control devices described herein would not be necessary.

What is claimed is:

1. An air bag control system, comprising:
   a restraining apparatus adapted to be connected to an occupant side of an air bag;
   an extension/retraction device used to adjust the degree to which said restraining apparatus can be extended; and
   a control device for controlling extension and retraction of said extension/retraction device;
   wherein said restraining apparatus can be retracted by said extension/retraction device in response to a signal sent by said control device to limit the physical extent to which the air bag can deploy to prevent injury of a vehicle occupant adjacent the air bag.

2. The system of claim 1, wherein said restraining apparatus comprises a plurality of tethers that are adapted to individually connect to the air bag.

3. The system of claim 2, wherein said tethers comprise high tenacity fiber yarns.

4. The system of claim 2, wherein said tethers comprise high tenacity fiber straps.

5. The system of claim 2, wherein said tethers are adapted to be arranged in a substantially circular pattern on the air bag.

6. The system of claim 1, wherein said extension/retraction device comprises a motorized take-up mechanism.

7. The system of claim 6, wherein said mechanism is indexed so as to prevent inadvertent extension of said restraining device.

8. The system of claim 1, wherein said control device comprises a microprocessor.

9. The system of claim 1, further comprising a sensing device which senses at least one physical characteristic of the occupant to be cushioned by the air bag.

10. The system of claim 9, wherein said sensing device is adapted to determine the weight of the occupant.

11. The system of claim 9, wherein said sensing device is adapted to determine the size of the occupant.

12. The system of claim 9, wherein said sensing device is adapted to determine the position of the occupant with respect to the undeployed air bag.

13. An air bag system, comprising:
   an air bag housing;
   an air bag disposed in said air bag housing, said air bag having an inflater side and an occupant side;
   a restraining apparatus connected to said occupant side of said air bag;
   an extension/retraction device used to adjust the degree to which said restraining apparatus can be extended relative to said housing; and
   a control device for controlling extension and retraction of said extension/retraction device;
   wherein said restraining apparatus can be retracted by said extention/retraction device in response to a signal sent by said control device to limit the physical extent to which the air bag can deploy to prevent injury of a vehicle occupant adjacent the air bag.

14. The system of claim 13, wherein said restraining apparatus comprises a plurality of tethers that are individually connect to said air bag.

15. The system of claim 14, wherein said tethers comprise high tenacity fiber yarns.

16. The system of claim 14, wherein said tethers comprise high tenacity fiber straps.

17. The system of claim 14, wherein said tethers are arranged in a substantially circular pattern on said air bag.

18. The system of claim 13, wherein said extension/retraction device comprises a motorized take-up mechanism.

19. The system of claim 18, wherein said mechanism is indexed so as to prevent inadvertent extension of said restraining device.

20. The system of claim 13, wherein said control device comprises a microprocessor.

21. The system of claim 13 further comprising a sensing device which senses at least one physical characteristic of the occupant to be cushioned by said air bag.

22. The system of claim 21, wherein said sensing device is adapted to determine the weight of the occupant.

23. The system of claim 21, wherein said sensing device is adapted to determine the size of the occupant.

24. The system of claim 21, wherein said sensing device is adapted to determine the position of the occupant with respect to the undeployed air bag.

25. A method for limiting the extent to which an air bag can deploy from its housing to prevent injury of a vehicle occupant adjacent the air bag, said method comprising the steps of:

connecting an occupant side of the air bag to a restraining apparatus;

providing a control device for controlling operation of the restraining apparatus;

receiving a signal to retract the restraining apparatus sent by the control device; and retracting the restraining apparatus in response to the signal sent by the control device to limit the degree to which the restraining apparatus can be extended relative to the housing to thereby limit the physical extent to which the air bag can be deployed.

26. The method of claim 25, further comprising the step of sensing at least one physical characteristic of the occupant to be cushioned by the air bag and transmitting a signal from a sensing device to the control device.

27. The method of claim 26, wherein the physical characteristic is the weight of the occupant.

28. The method of claim 26, wherein the physical characteristic is the size of the occupant.

29. The method of claim 26, wherein the physical characteristic is the position of the occupant with respect to the undeployed air bag.

30. An air bag control system, comprising:

a telescopic restraining device adapted to be connected to an occupant side of an air bag;

an extension/retraction device used to adjust the degree to which said telescopic restraining device can be extended; and a control device for controlling extension and retraction of said extension/retraction device;

wherein said telescopic restraining device can be retracted by said extension/retraction device in response to a signal sent by said control device to limit the physical extent to which the air bag can deploy to prevent injury of a vehicle occupant adjacent the air bag.

* * * * *

UNITED STATES PATENT AND TRADEMARK OFFICE
CERTIFICATE OF CORRECTION

PATENT NO.   : 6,254,130 B1
DATED        : July 3, 2001
INVENTOR(S)  : Jayaraman et al.

It is certified that error appears in the above-identified patent and that said Letters Patent is hereby corrected as shown below:

Column 1,
Line 39, after "injuries", delete ","

Column 3,
Line 7, delete "yams" and replace with "yarns"

Column 6,
Lines 24, and 67, after "restraining", delete "device" and replace with "apparatus"

Signed and Sealed this

Eleventh Day of December, 2001

Attest:

NICHOLAS P. GODICI
*Attesting Officer*        *Acting Director of the United States Patent and Trademark Office*